US012802313B2

(12) United States Patent
Ding et al.

(10) Patent No.: US 12,802,313 B2
(45) Date of Patent: Nov. 17, 2026

(54) DOSE-LESS ORGAN SEGMENTATION BASED ON NUCLEAR IMAGE

(71) Applicant: Siemens Medical Solutions USA, Inc., Malvern, PA (US)

(72) Inventors: Xinhong Ding, Buffalo Grove, IL (US); Kevin Scott Hakl, Barrington, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 255 days.

(21) Appl. No.: 18/433,924

(22) Filed: Feb. 6, 2024

(65) Prior Publication Data

US 2025/0252619 A1 Aug. 7, 2025

(51) Int. Cl.

| | |
|---|---|
| ***G06T 12/00*** | (2026.01) |
| ***A61B 6/03*** | (2006.01) |
| ***G06T 3/4046*** | (2024.01) |
| ***G06T 7/10*** | (2017.01) |
| ***G06T 12/10*** | (2026.01) |

(52) U.S. Cl.

CPC ............ *G06T 12/10* (2026.01); *G06T 3/4046* (2013.01); *G06T 7/10* (2017.01); *G06T 2207/10072* (2013.01); *G06T 2207/20081* (2013.01); *G06T 2207/20084* (2013.01)

(58) Field of Classification Search

USPC ................................ 382/131, 128, 155–156

See application file for complete search history.

(56) References Cited

U.S. PATENT DOCUMENTS

| | | | | |
|---|---|---|---|---|
| 10,242,440 | B2 | 3/2019 | Vija et al. | |
| 11,854,126 | B2 * | 12/2023 | Schaefferkoetter | A61B 6/037 |
| 12,073,492 | B2 * | 8/2024 | Shi | A61B 6/037 |
| 2013/0077844 | A1 * | 3/2013 | Vija | G06T 7/0012 382/131 |
| 2013/0266198 | A1 * | 10/2013 | Pereira | G06T 7/0012 382/131 |
| 2020/0126214 | A1 * | 4/2020 | Hu | A61B 6/032 |
| 2020/0311932 | A1 * | 10/2020 | Hooper | G06F 18/2413 |
| 2022/0207791 | A1 * | 6/2022 | Shi | G06N 3/088 |
| 2022/0292742 | A1 * | 9/2022 | Mailhe | G06T 7/11 |
| 2023/0115732 | A1 * | 4/2023 | Brynolfsson | G06T 7/33 |
| 2024/0077565 | A1 * | 3/2024 | Neelavalli | G01R 33/5608 |
| 2024/0233213 | A1 * | 7/2024 | Qiang | A61B 6/037 |

(Continued)

OTHER PUBLICATIONS

Li et al., Eliminating CT radiation for clinical PET examination using deep learning, European Journal of Radiology, Jun. 23, 2022, 0720-048X/@2022 Elsevier, http//doi.org/10.1016/j.ejrad.2022.110422, pp. 1-9 . . . (Year: 2022).*

(Continued)

*Primary Examiner* — Ishrat I Sherali

(57) ABSTRACT

A system and method includes acquisition of nuclear imaging data, reconstruction of a three-dimensional image based on nuclear imaging data, input of the three-dimensional image to a trained convolutional network to either generate a linear attenuation correction map and a simulated computed tomography image based on the linear attenuation correction map or generate simulated computer tomography images directly, application of a segmentation algorithm to the simulated computed tomography image to generate a segmentation map, and display of the segmentation map.

13 Claims, 9 Drawing Sheets

(56) References Cited

U.S. PATENT DOCUMENTS

| | | | | |
|---|---|---|---|---|
| 2024/0242398 | A1* | 7/2024 | Xi | G06N 3/045 |
| 2024/0404128 | A1* | 12/2024 | Shah | G06T 7/11 |
| 2025/0148663 | A1* | 5/2025 | Millardet | G06T 12/20 |

OTHER PUBLICATIONS

Guan et al., Synthetic CT Generation via Variant Invertible Network for All-digital Brain PET Attenuation Correction , Oct. 3, 2023, arxiv.org, Arxiv ID 2310.01885, pp. 1-11. (Year: 2023).*

* cited by examiner

DOSE-LESS ORGAN SEGMENTATION BASED ON NUCLEAR IMAGE

BACKGROUND

Modern medical imaging provides increasingly-sophisticated quantitative and qualitative views of internal anatomy and biological processes. It is often desirable to identify the outer bounds and relative positions of internal anatomical structures based on acquired medical images. This identification is referred to as image segmentation and the output of image segmentation is known as a segmentation map.

Techniques for determining segmentation maps from Magnetic Resonance (MR) and Computed Tomography (CT) images are well-known. However, high-quality image segmentation techniques are not available to determine segmentation maps from images generated by nuclear imaging systems such as single-photon-emission-computer-tomography (SPECT) and positron-emission-tomography (PET) imaging systems. Some SPECT and PET systems are integrated with a CT imaging system (i.e., SPECT/CT and PET/CT). Using these systems, a CT image is acquired contemporaneously with a SPECT or PET image, the CT image is segmented to produce a segmentation map, and the segmentation map is overlaid on the SPECT or PET image.

Contemporaneous acquisition of a CT image is unsuitable in many nuclear imaging scenarios. Foremost, the approach is not possible if a CT system is unavailable. Additionally, acquisition of CT data subjects the patient to a radiation dose which is additional to any dose originating from an injected nuclear imaging tracer. Systems are therefore desired for generating suitable segmentation maps from nuclear imaging data and which do not require contemporaneous acquisition of CT data.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments efficiently generate a high-quality segmentation map based on a nuclear image. Accordingly, some embodiments provide technical improvements over existing image segmentation systems which require a separate CT scan and its resultant additional radiation dose, and/or which produce unsatisfactory segmentation maps based solely on nuclear images.

Figure 1:
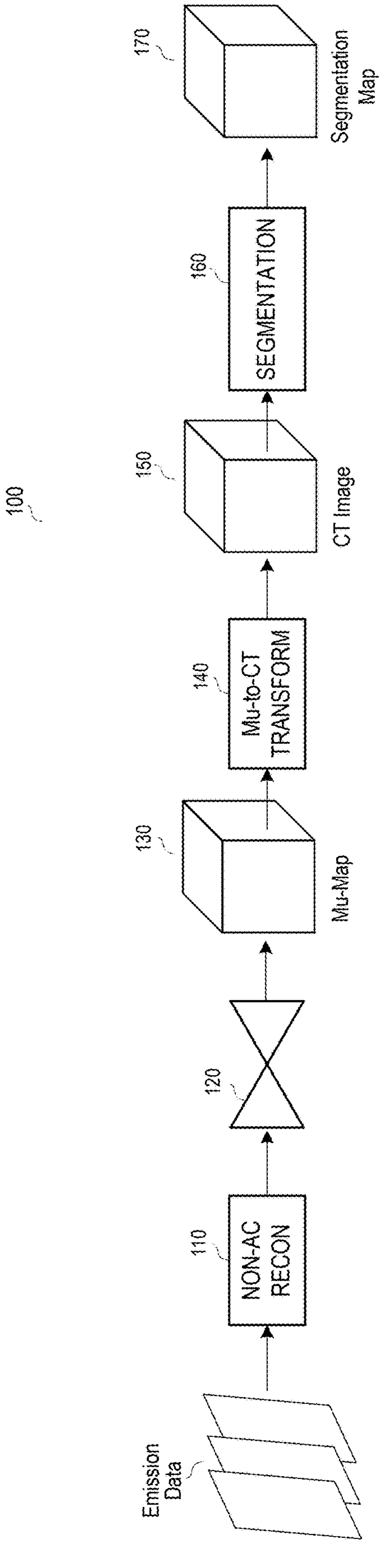
FIG. 1 is a block diagram of a system to generate a segmentation map based on nuclear imaging data according to some embodiments.

FIG. 1 is a block diagram of system 100 to generate a segmentation map based on nuclear imaging data according to some embodiments. The functional components of system 100 may be implemented in computer hardware, in program code and/or in one or more computing systems executing such program code as is known in the art. Such a computing system may include one or more processing units which execute processor-executable program code stored in a memory system. More than one functional component may be implemented by a single computing system in some embodiments. One or more of the computing systems may comprise a virtual machine, and one-or more computing systems may comprise a cloud-based compute resource providing on-demand scalability and failure recovery.

According to nuclear imaging techniques, a radiotracer is injected into or ingested by a subject and radiation (e.g., gamma rays) is emitted from within the subject and captured by detector elements. In the illustrated embodiment, the detector elements capture a plurality of sets of two-dimensional emission data, or projection images, each of which may be considered a "frame" and is associated with a respective time period. The time period of two frames may overlap in some scenarios. Embodiments are not limited to sets of two-dimensional emission data. Any format of raw image data may be used, including but not limited to list mode data, sinograms, and photon counting data.

Reconstruction unit 110 receives the emission data. Reconstruction unit 110 performs a reconstruction operation on the emission data and outputs a non-attenuation-corrected reconstructed three-dimensional image. Reconstruction unit 110 may execute any suitable non-attenuation-corrected reconstruction operation that is or becomes known. In some examples, the dimensions of the reconstructed three-dimensional image are 128×128 or 256×256 voxels (for simplicity, the number of slices will be omitted hereinafter).

The reconstructed three-dimensional image is input to trained network 120. Trained network 120 may comprise a fully convolutional neural network having parameters trained as described below. Network 120 may comprise hardware and software specifically-intended for executing algorithms based on a specified network architecture and trained parameters.

Network 120 may comprise any type of supervised learning-compatible network that is or becomes known, including but not limited to a U-net or other convolutional neural network. The network training described below generates parameter values for the kernels of a fully convolutional network. Advantageously, a fully convolutional network comprising thusly-parameterized kernels may be efficiently incorporated within a SPECT or PET reconstruction algorithm to generate a segmentation map, without requiring any additional user interaction.

According to some embodiments, network 120 includes a down-convolution portion and an up-convolution portion. The down-convolution portion consists of a set of convolution layers, with the image size of each subsequent layer being less than or equal to the prior layer in order to capture increasingly fine-structured features of an input image. The up-convolution portion also includes a set of convolution layers, with the image size of each subsequent layer being greater than or equal to the prior layer in order to generate an output image of the same size as the input image.

Network 120 generates mu-map 130 based on the non-attenuation-corrected reconstructed volume received from component 110. Absorption or scattering within subject tissue attenuates the radiation prior to reception of the radiation by the detector elements. Accordingly, in nuclear imaging paradigms such as SPECT and PET, image reconstructions may incorporate attenuation corrections to generate visually realistic and clinically accurate images. The most common attenuation corrections are based on Linear Attenuation Coefficient (LAC) maps ("mu-maps") which are typically derived from a CT scan of the subject tissue using well-known techniques.

Mu-to-CT transform component 140 applies the inverse of any well-known CT-to-Mu-map algorithm to generate CT image 150 from mu-map 130. Segmentation component 160 performs image segmentation on CT image 150 to generate segmentation map 170.

Many open-source and proprietary libraries provide image segmentation of three-dimensional CT images. Depending on the image segmentation algorithm used by segmentation component 160, it may be preferable or required for CT image 150 to exhibit typical CT image dimensions of 512×512 voxels. Mu-map 130 may share the same dimensions (i.e., 128×128 or 256×256) as the non-attenuation-corrected volume input to network 120. Accordingly, mu-to-CT transform component 140 may generate a 128×128 CT image and upsample the image to 512×512 or the upsampling may be integrated into the transformation without requiring generation of an intermediate CT image.

Figure 2:
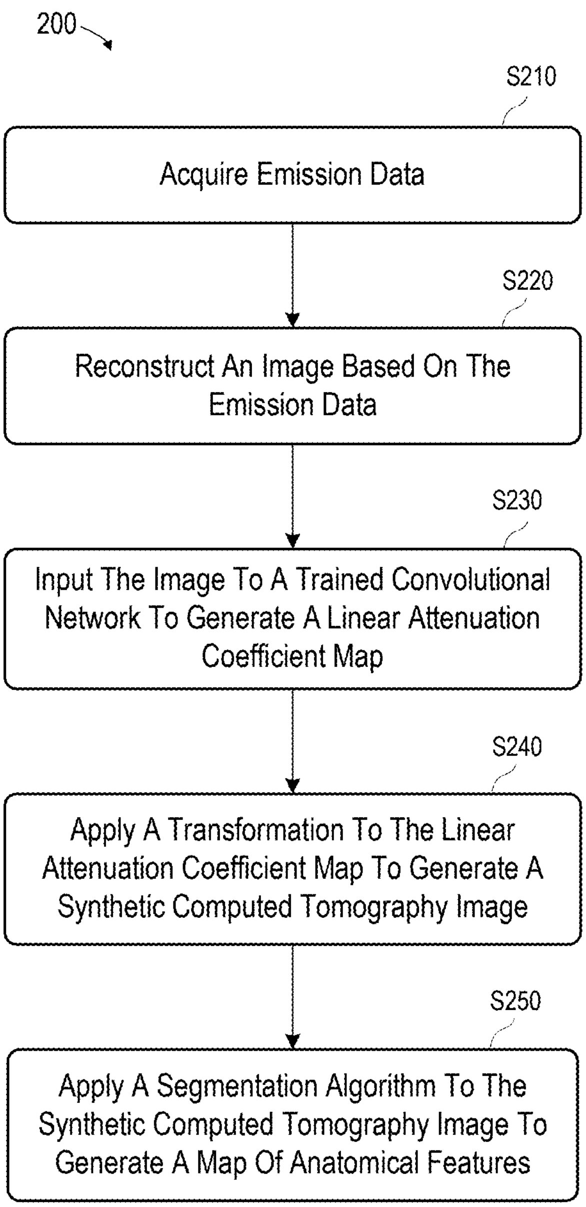
FIG. 2 is a flow diagram of a process to generate a segmentation map based on nuclear imaging data according to some embodiments.

FIG. 2 is a flow diagram of process 200 to describe operation of system 100 according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Emission data is initially acquired at S210. As noted above, emission data may be acquired by injecting a radiotracer is injected into a subject and detecting radiation emitted therefrom using a SPECT or PET detector. In some embodiments, S210 simply includes reading already-acquired emission data from a data storage system. That is, process 200 may be executed long after emission data is acquired by a nuclear imaging system, and also in a different location.

An image is reconstructed from the emission data at S220 using any suitable reconstruction algorithm. The reconstruction at S220 does not use any contemporaneously-acquired attenuation information and is therefore referred to as non-attenuation-corrected reconstruction.

The reconstructed image is input to a trained convolutional network at S230 to generate an LAC, or mu-, map. Next, at S240, a transformation is applied to the mu-map to generate a CT image. The CT image may be considered a "simulated" CT image since it is not produced directly from CT data. The dimensions of the simulated CT image may be larger than those of the image reconstructed at S220 and of the mu-map generated at S230, in order to conform the CT image to an input format expected by an image segmentation algorithm.

In this regard, an image segmentation algorithm is applied to the simulated CT image at S250. The image segmentation algorithm generates a segmentation map of anatomical features. The segmentation map may be displayed to a user to assist in diagnosis and/or treatment planning. According to some embodiments, a composite image is generated based on the segmentation map and the nuclear image reconstructed at S220. Advantageously, such a composite image may efficiently and accurately depict tracer distribution with respect to organ boundaries.

Figure 3:
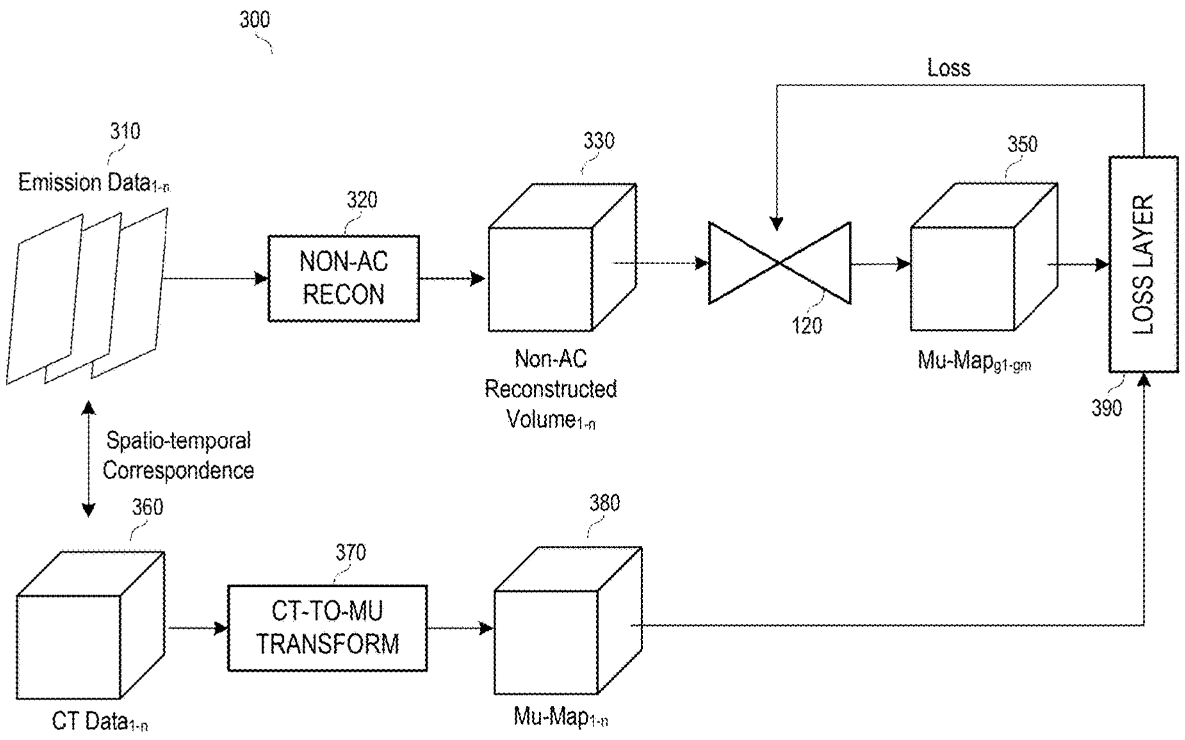
FIG. 3 is a block diagram of a system to train a neural network to generate a linear attenuation coefficient map based on nuclear imaging data according to some embodiments.

FIG. 3 illustrates system 300 for training network 120 to generate mu-maps according to some embodiments. As is known in the art, training of network 120 involves determining a loss based on the output of network 120 and iteratively modifying network 120 based on the loss until the loss reaches an acceptable level or training otherwise terminates (e.g., due to time constraints or to the loss asymptotically approaching a lower bound).

Network 120 is trained based on training data which includes N sets of emission data 310 and N respectively corresponding sets of CT data 360. For example, a first set of emission data 310 was acquired by scanning a subject with a nuclear imaging system and a first set of CT data 360 was acquired by scanning the subject with a CT scanner. The scans are preferably contemporaneous and also fairly well registered, as is typically the case in PET/CT and SPECT/CT scanning.

The first set of emission data 310 is subjected to non-attenuation-corrected reconstruction by component 320 to create a first non-attenuation-corrected reconstructed volume 330. CT-to-mu transform component 370 transforms the first set of CT data 360 to a first mu-map 380. Although depicted as a three-dimensional image, CT data 360 may comprise any format suitable for input to component 370. This process repeats for N−1 additional sets of emission data 310 and CT data 360 to result in non-attenuation-corrected volumes$_{1-n}$ 330 and respective mu-maps$_{1-n}$ 380.

During training, network 120 receives a batch of M non-attenuation-corrected volumes$_{1-n}$ 320 and generates a mu-map$_{g1-gm}$ 350 for each received volume. Loss layer component 390 determines a total loss for the batch by comparing each generated mu-map$_{g1-gm}$ 350 to a corresponding one of "ground truth" mu-maps$_{1-n}$ 380. The loss may comprise a binary cross entropy loss, an L1 loss, an L2 loss, or any other suitable measure of total loss. An L1 loss is the sum of the absolute differences between each output mu-map and its corresponding ground truth mu-map, and an L2 loss is the sum of the squared differences between each output mu-map and its corresponding ground truth mu-map.

The loss is back-propagated to network 120, which changes its internal weights, or kernel parameter values, as is known in the art. A new batch of training data is processed by network 120 and loss layer 390 as described above and the process repeats until it is determined that the total loss has reached an acceptable level or training otherwise terminates. At termination, the convolution kernels of network 120 may be considered trained. The parameter values of the trained convolutional kernels may then be deployed in a convolutional network as shown in FIG. 1 in order to generate mu-maps based on emission data.

Figure 4:
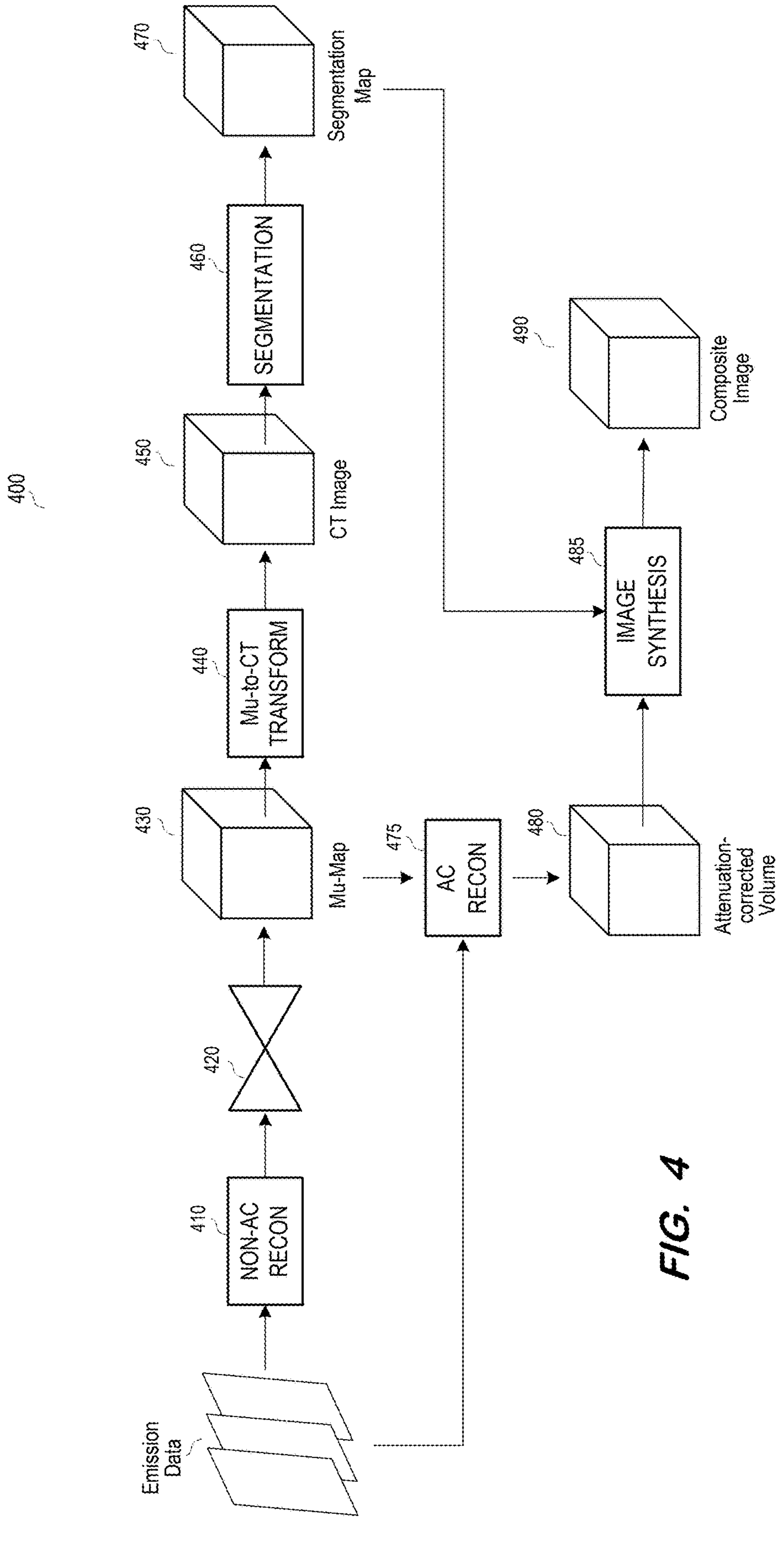
FIG. 4 is a block diagram of a system to generate a segmentation map and an attenuation-corrected nuclear image based on nuclear imaging data according to some embodiments.

FIG. 4 is a block diagram of system 400 to generate a segmentation map and an attenuation-corrected nuclear image based on nuclear imaging data according to some embodiments. Components 410, 420, 440 and 460 may operate as described above with respect to similarly-named components of system 100 to generate segmentation map 470 from nuclear emission data and without acquiring CT data.

Unlike system 200, system 400 leverages the creation of mu-map 430 to generate an improved nuclear image. As shown, attenuation-correcting reconstruction component 475 receives the original emission data and mu-map 430. Using known techniques, component 475 generates attenuation-corrected volume 480 based on the emission data and mu-map 430. Attenuation-corrected volume 480 likely exhibits significantly-higher quality than the non-attenuation-corrected image output by component 410.

In some embodiments, image synthesis component 485 generates composite image 490 based on segmentation map 470 and attenuation-corrected volume 480. Composite image 490 may therefore depict both the organ boundaries and the activity distribution within the subject. Composite image 490 may be generated simply by adding together the voxel values of segmentation map 470 and attenuation-corrected volume 480. Since segmentation map 470 and attenuation-corrected volume 480 may exhibit different dimensions, image synthesis component 485 may downsample or upsample one or both of segmentation map 470 and attenuation-corrected volume 480 as needed.

Figure 5:
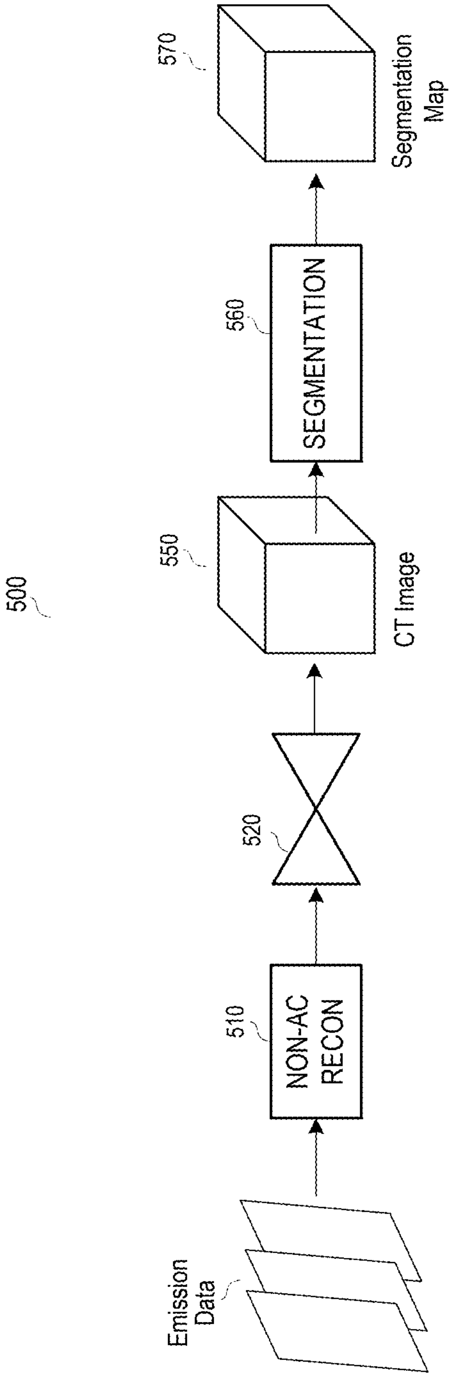
FIG. 5 is a block diagram of a system to generate a segmentation map based on nuclear imaging data according to some embodiments.

FIG. 5 is a block diagram of system 500 to generate a segmentation map based on nuclear imaging data according to some embodiments. In contrast to system 100, network 520 of system 500 has been trained to generate a CT image directly from nuclear imaging emission data. System 500 thereby eliminates some steps of system 100 but does not provide a mu-map which may be used to perform attenuation-corrected reconstruction on the emission data as described above with respect to system 400.

In operation, reconstruction unit 510 performs a reconstruction operation on the emission data and outputs a non-attenuation-corrected reconstructed three-dimensional image to trained network 520. Trained network 520 generates CT image 550 based on the non-attenuation-corrected reconstructed volume received from component 510. Segmentation component 560 performs image segmentation on CT image 550 to generate segmentation map 570. As noted above, many open-source and proprietary libraries provide image segmentation of three-dimensional CT images.

Figure 6:
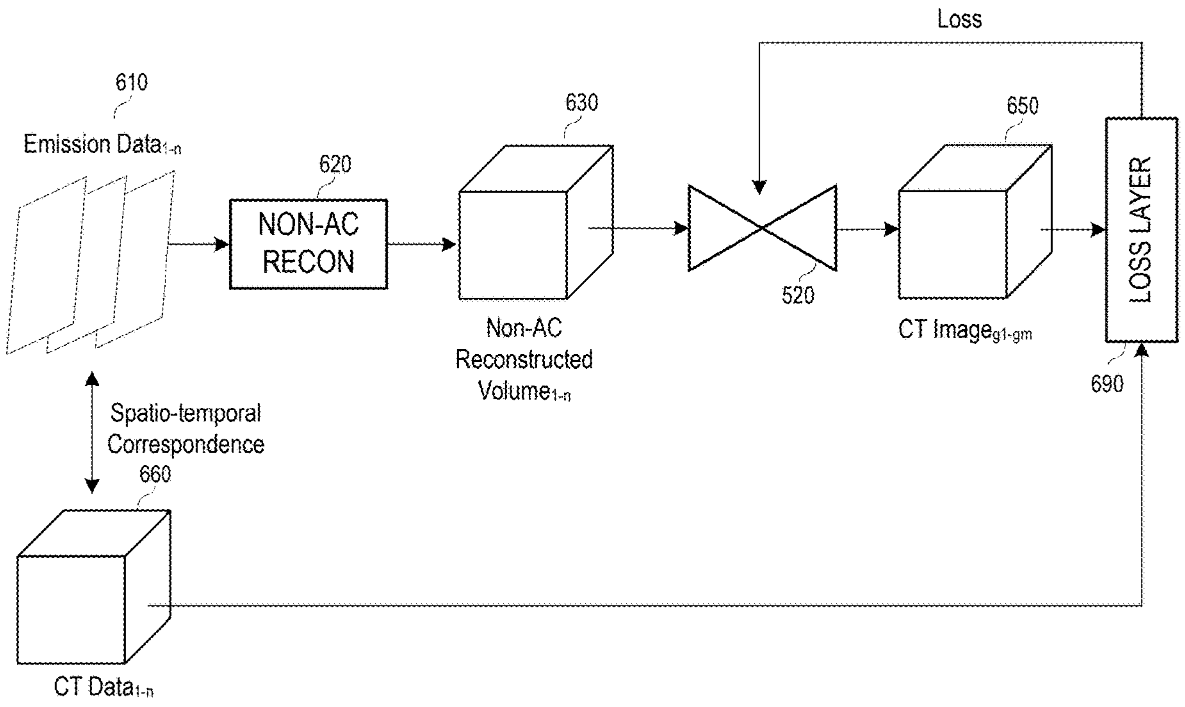
FIG. 6 is a block diagram of a system to train a neural network to generate a CT image based on nuclear imaging data according to some embodiments.

FIG. 6 is a block diagram of system 600 to train neural network 520 to generate a CT image based on nuclear imaging data according to some embodiments. Network 520 is trained based on N sets of emission data 610 and N respectively corresponding sets of CT data 660. Each set of emission data 610 is subjected to non-attenuation-corrected reconstruction by component 620 to create corresponding non-attenuation-corrected volumes$_{1\text{-}n}$ 630.

During training, network 520 receives a batch of M non-attenuation-corrected volumes$_{1\text{-}n}$ 620 and generates a CT image$_{g1\text{-}gm}$ 650 from each received volume. Loss layer component 690 determines a total loss for the batch by comparing each generated CT image$_{g1\text{-}gm}$ 350 to a corresponding one of "ground truth" CT images$_{1\text{-}n}$ 660. The loss is back-propagated to network 520, which changes its internal weights based thereon (e.g., using Stochastic Gradient Descent). This process repeats until it is determined that the total loss has reached an acceptable level or training otherwise terminates. At termination, the convolution kernels of network 520 are be considered trained and their parameter values may be deployed in a convolutional network as shown in FIG. 5 in order to generate CT images based on emission data.

Figure 7:
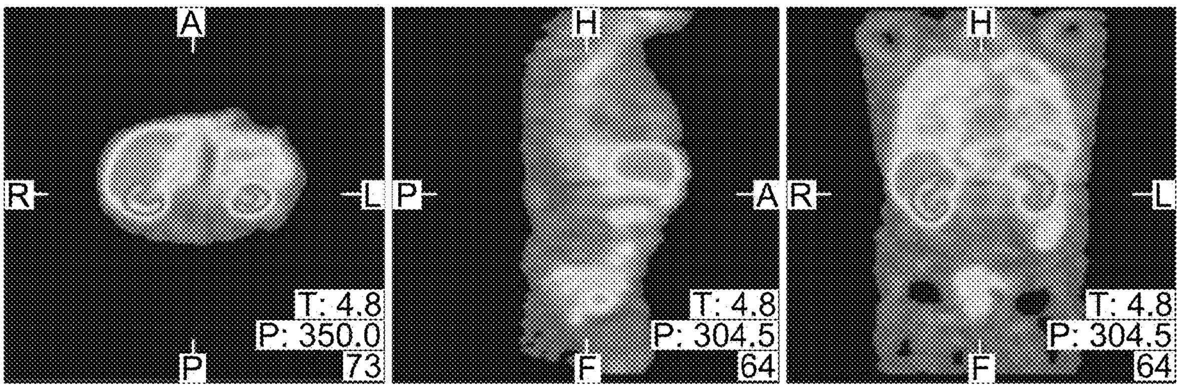
FIG. 7 comprises slices of a three-dimensional SPECT image according to some embodiments.
Figure 8:
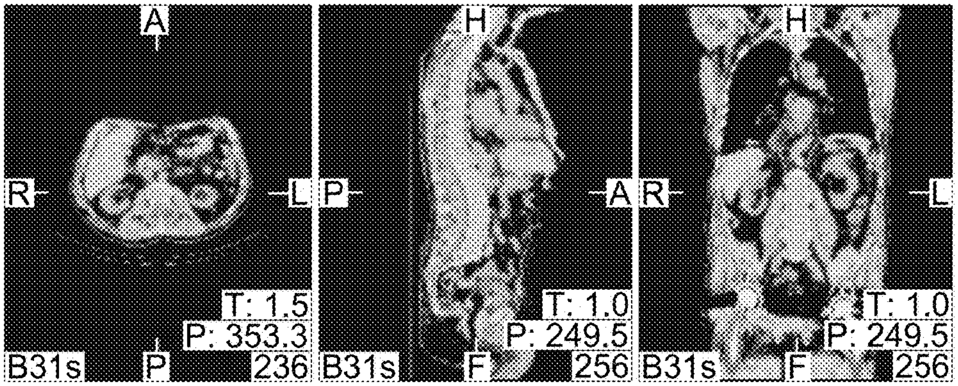
FIG. 8 comprises slices of a three-dimensional linear attenuation coefficient map according to some embodiments.

FIG. 7 comprises slices of a three-dimensional SPECT image according to some embodiments. The slices may be taken from a non-attenuation-reconstructed 128×128 image. FIG. 8 comprises slices of a three-dimensional linear attenuation coefficient map according to some embodiments. The three-dimensional linear attenuation coefficient map may be generated by a trained neural network from the FIG. 7 image as described above, and may also have dimensions of 128×128.

Figure 9:
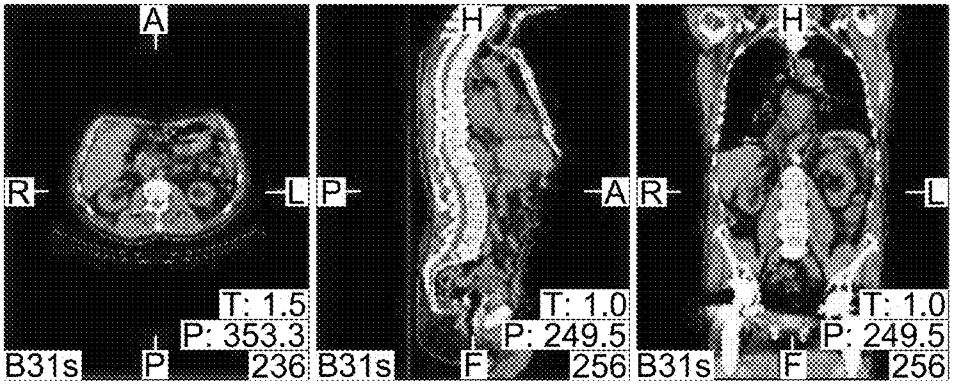
FIG. 9 comprises slices of a simulated three-dimensional CT image according to some embodiments.

FIG. 9 comprises slices of a simulated three-dimensional CT image according to some embodiments. The CT image is generated from the three-dimensional linear attenuation coefficient map of FIG. 8 using a known mu-to-CT transform and upsampling. The CT image may have dimensions of 512×512 and be thereby suitable for known image segmentation algorithms. Other dimensions may be used for input to other or future segmentation algorithms.

Figure 10:
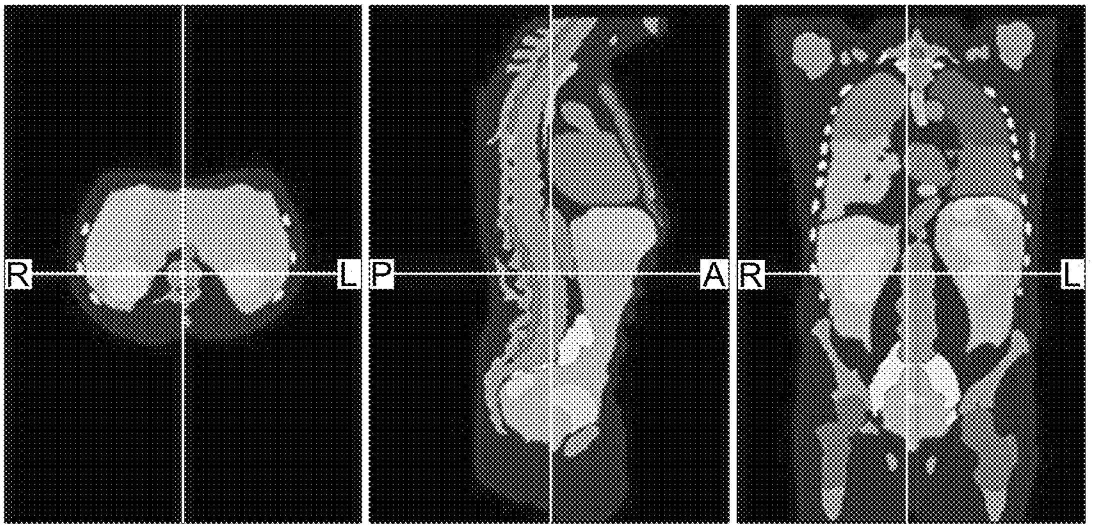
FIG. 10 comprises slices of a three-dimensional segmentation map according to some embodiments.
Figure 11:
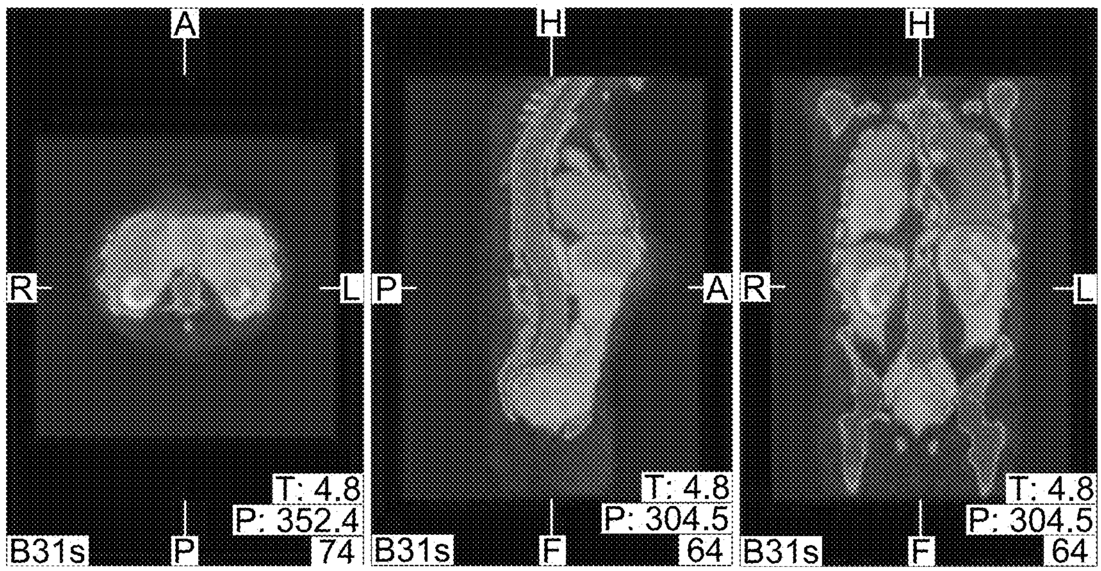
FIG. 11 comprises slices of a composite three-dimensional image according to some embodiments.

FIG. 10 comprises slices of a three-dimensional segmentation map generated based on the three-dimensional CT image of FIG. 9 according to some embodiments. The dimensions of the FIG. 10 segmentation map are 512×512 but embodiments are not limited thereto. FIG. 11 comprises slices of a composite three-dimensional image generated from the images of FIG. 7 and FIG. 10 according to some embodiments. If the FIG. 7 image is 128×128 or 256×256 voxels in size, the FIG. 10 segmentation map may be downsampled to that size prior to combining the two images.

Figure 12:
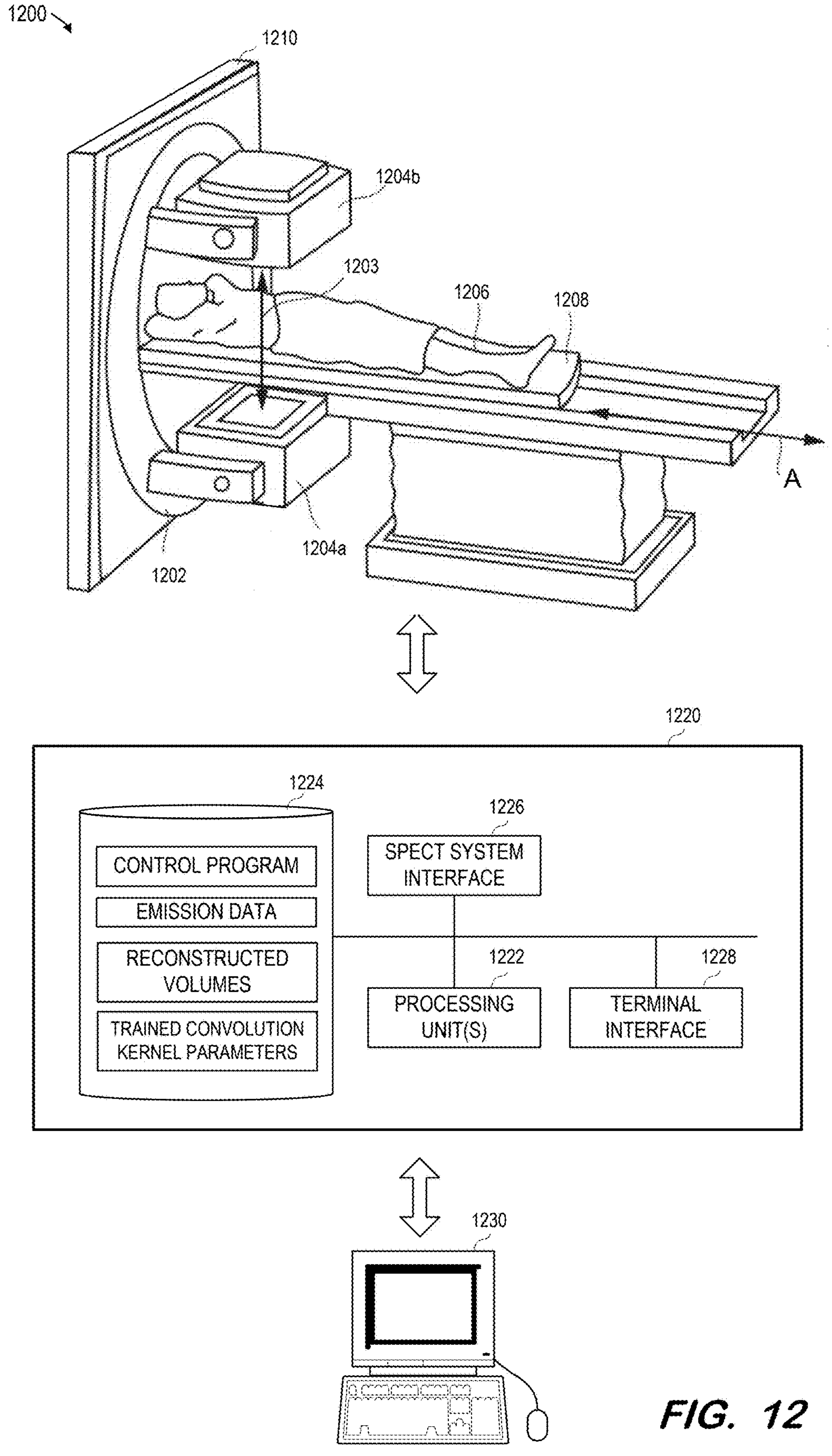
FIG. 12 illustrates a SPECT imaging system according to some embodiments.

FIG. 12 illustrates SPECT system 1200 to execute any of the processes described above. Embodiments may utilize other SPECT system designs, including but not limited to cardiac cameras. System 1200 may deploy a trained convolutional network to generate a segmentation map from emission data as described herein.

System 1200 includes gantry 1202 to which two or more gamma cameras 1204*a*, 1204*b* are attached, although any number of gamma cameras can be used. A detector within each gamma camera detects gamma photons (i.e., emission data) emitted by a radioisotope within the body of a patient 1206 lying on a bed 1208. Bed 1208 is slidable along axis-of-motion A. At respective bed positions (i.e., imaging positions), a portion of the body of patient 1206 is positioned between gamma cameras 1204*a*, 1204*b* in order to capture emission data 1203 from that body portion.

Control system 1220 may comprise any general-purpose or dedicated computing system. Accordingly, control system 1220 includes one or more processing units 1222 configured to execute processor-executable program code to cause system 1220 to operate as described herein, and storage device 1224 for storing the program code. Storage device 1224 may comprise one or more fixed disks, solid-state random access memory, and/or removable media (e.g., a thumb drive) mounted in a corresponding interface (e.g., a USB port).

Storage device 1224 stores program code of a control program, which one or more processing units 1222 may execute to, in conjunction with SPECT system interface 1226, control motors, servos, and encoders to cause gamma cameras 1204*a*, 1204*b* to rotate along gantry 1202 and to acquire emission data at defined imaging positions during the rotation. The acquired emission data may be stored in memory 1224.

One or more processing units 1222 may also execute the system control program to reconstruct a volume from the emission data and to input the volume to a network implementing trained convolution kernel parameters in order to generate a corresponding mu-map as described herein. The Mu-map may be used to generate a CT image, and the CT image may be subjected to image segmentation.

The resulting segmentation map may be transmitted to terminal 1230 via terminal interface 1228. Terminal 1230 may comprise a display device and an input device coupled to system 1220. Terminal 1230 may display any of two-dimensional emission data, CT data, mu-maps, segmentation maps, etc., and may receive user input for controlling display of the data, operation of imaging system 1200, and/or the processing described herein. In some embodiments, terminal 1230 is a separate computing device such as, but not limited to, a desktop computer, a laptop computer, a tablet computer, and a smartphone.

Each of component of system 1200 may include other elements which are necessary for the operation thereof, as well as additional elements for providing functions other than those described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:

a storage device;

a processing unit to execute executable program code stored on the storage device to cause the system to:

reconstruct a non-attenuation-corrected three-dimensional image based on nuclear imaging data;

input the non-attenuation-corrected three-dimensional image to a trained convolutional network and receive a linear attenuation correction map output from the trained convolutional network in response to the input of the non-attenuation-corrected three-dimensional image;

generate a simulated computed tomography image based on the linear attenuation correction map;

apply a segmentation algorithm to the simulated computed tomography image to generate a segmentation map; and reconstruct an attenuation-corrected three-dimensional image based on the nuclear imaging data and the linear attenuation correction map, wherein the attenuation-corrected three-dimensional image is spatially registered with the segmentation map.

2. The system of claim 1, the processing unit to execute program code stored on the storage device to cause the system to:

display the segmentation map and the attenuation-corrected three-dimensional image.

3. The system of claim 2, wherein display of the segmentation map and the attenuation-corrected three-dimensional image comprises:

generation of a composite image based on the segmentation map and the attenuation-corrected three-dimensional image; and display of the composite image.

4. The system of claim 1, the processing unit to execute program code stored on the storage device to cause the system to:

generate a composite image based on the segmentation map and the attenuation-corrected three-dimensional image; and display the composite image.

5. The system of claim 1, wherein generation of a simulated computed tomography image based on the linear attenuation correction map comprises:

generation of an initial simulated computed tomography image based on the linear attenuation correction map; and upsampling of the initial simulated computed tomography image to generate the simulated computed tomography image.

6. A method comprising:

acquiring nuclear imaging data;

reconstructing a non-attenuation-corrected three-dimensional image based on nuclear imaging data;

inputting the non-attenuation-corrected three-dimensional image to a trained convolutional network;

receiving a linear attenuation correction map output from the trained convolutional network in response to inputting the non-attenuation-corrected three-dimensional image;

generating a simulated computed tomography image based on the linear attenuation correction map;

applying a segmentation algorithm to the simulated computed tomography image to generate a segmentation map; and reconstructing an attenuation-corrected three-dimensional image based on the nuclear imaging data and the linear attenuation correction map, wherein the attenuation-corrected three-dimensional image is spatially registered with the segmentation map.

7. The method of claim 6, the method further comprising:

displaying the segmentation map and the attenuation-corrected three-dimensional image.

8. The method of claim 7, wherein displaying the segmentation map and the attenuation-corrected three-dimensional image comprises:

generating a composite image based on the segmentation map and the attenuation-corrected three-dimensional image; and displaying the composite image.

9. The method of claim 6, wherein generating a simulated computed tomography image based on the linear attenuation correction map comprises:

generating an initial simulated computed tomography image based on the linear attenuation correction map; and upsampling the initial simulated computed tomography image to generate the simulated computed tomography image.

10. A system comprising:

a nuclear imaging system to acquire emission data associated with a subject;

a processing unit to:

reconstruct a non-attenuation-corrected three-dimensional image based on the emission data;

input the non-attenuation-corrected three-dimensional image to a trained convolutional network and receive a linear attenuation correction map output from the trained convolutional network in response to the input of the non-attenuation-corrected three-dimensional image;

generate a simulated computed tomography image based on the linear attenuation correction map;

apply a segmentation algorithm to the simulated computed tomography image to generate a segmentation map; and reconstruct an attenuation-corrected three-dimensional image based on the nuclear imaging data and the linear attenuation correction map, wherein the attenuation-corrected three-dimensional image is spatially registered with the segmentation map.

11. The system of claim 10, further comprising a display to display the segmentation map and the attenuation-corrected three-dimensional image.

12. The system of claim 11, the processing unit to generate a composite image based on the segmentation map and the attenuation-corrected three-dimensional image, wherein display of the segmentation map and the attenuation-corrected three-dimensional image comprises display of the composite image.

13. The system of claim 10, wherein generation of a simulated computed tomography image based on the linear attenuation correction map comprises:

generation of an initial simulated computed tomography image based on the linear attenuation correction map; and upsampling of the initial simulated computed tomography image to generate the simulated computed tomography image.

* * * * *